(12) United States Patent
Subramaniam et al.

(10) Patent No.: US 11,720,964 B2
(45) Date of Patent: Aug. 8, 2023

(54) SYSTEM AND METHOD FOR NATURAL LANGUAGE ORDER FILL

(71) Applicant: JPMorgan Chase Bank, N.A., New York, NY (US)

(72) Inventors: Senthilkumar Subramaniam, Tiruppur (IN); Jyoti Roy, Bangalore (IN); Tushar Agrawal, Bangalore (IN); Prajod Kumbalaparambil Ramanunni, Singapore (SG); Vijayasingam Thanasekaran, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 9 days.

(21) Appl. No.: 17/222,511

(22) Filed: Apr. 5, 2021

(65) Prior Publication Data

US 2022/0270170 A1    Aug. 25, 2022

(30) Foreign Application Priority Data

Feb. 22, 2021   (IN) .............................. 202111007384

(51) Int. Cl.
| | |
|---|---|
| *G06Q 40/00* | (2023.01) |
| *G06Q 40/04* | (2012.01) |
| *G06F 40/20* | (2020.01) |
| *G06N 3/04* | (2023.01) |
| *G06N 20/00* | (2019.01) |

(52) U.S. Cl.
CPC ............. *G06Q 40/04* (2013.01); *G06F 40/20* (2020.01); *G06N 3/04* (2013.01); *G06N 20/00* (2019.01)

(58) Field of Classification Search
CPC .......... G06Q 40/04; G06N 20/00; G06N 3/04; G06N 3/0445; G06F 40/20
USPC .................................................. 705/4, 35–45
See application file for complete search history.

(56) References Cited

U.S. PATENT DOCUMENTS

| | | | | |
|---|---|---|---|---|
| 2015/0317730 A1* | 11/2015 | Kalinichenko | ........ | G06Q 40/04 705/37 |
| 2018/0330443 A1* | 11/2018 | Mauro, Jr. | ............. | G06Q 40/04 |
| 2022/0100756 A1* | 3/2022 | Bodigutla | ................ | G06N 3/08 |

\* cited by examiner

*Primary Examiner* — Jessica Lemieux
*Assistant Examiner* — Mohammed H Mustafa
(74) *Attorney, Agent, or Firm* — Greenblum & Bernstein, P.L.C.

(57) ABSTRACT

Various methods, apparatuses/systems, and media for implementing a natural language order fill module are disclosed. A database stores data corresponding to trade details of a particular trade. A processor is operatively coupled to the database via a communication network. The processor configures a free-form text box to receive user input data corresponding to the trade details (e.g., abbreviations data, varying sentence syntax data, special characters data and details data, etc.) of the particular trade; implements neural networks algorithm to interpret and extract key trade details data from the receive user input data corresponding to the trade details of the particular trade regardless of text structure of the input data; and automatically fills in corresponding trading ticket fields in real-time based on the extracted key trade details data.

17 Claims, 5 Drawing Sheets

SYSTEM AND METHOD FOR NATURAL LANGUAGE ORDER FILL

CROSS-REFERENCE TO RELATED APPLICATIONS

This application claims the benefit of priority from Indian Provisional Patent Application No. 202111007384, filed Feb. 22, 2021, which is herein incorporated by reference in its entirety.

TECHNICAL FIELD

This disclosure generally relates to data processing, and, more particularly; to methods and apparatuses for implementing a natural language order fill module configured with a free-form text box to receive user input data related to trade details with no restrictions or limitations.

BACKGROUND

Conventional process for entering trading ticket details may be very structured, time consuming, and may have limited flexibility. For example, trade details must be entered in a certain order and specific format according to the ticket entry form, which often may not be identical to the way a user receives the trade details in conversations and emails. Although the ticket entry process may be similar for any trade, there appears to be variances in required fields and details per ticket specific to the asset class and/or product offering. Often a user may need to enter multiple tickets per day. Therefore, the user may be forced to enter some time-insensitive trades in between meetings and/or at the end of a day. This labor intensive ticket entry process may increase the chance for entry errors and may prove to be a time demanding task to the user's already busy day.

Furthermore, for time-sensitive trades (e.g., equity options), the user may need to fill in many fields quickly, some tickets have close to thirty (30) fields to complete before the trade can be executed. Tickets also do not have a copy/paste functionality to help streamline similar ticket entries. In trading situations where every second counts, this manual time consuming ticket entry process could lead to delays and missed opportunities to capitalize on timely trades.

SUMMARY

The present disclosure, through one or more of its various aspects, embodiments, and/or specific features or sub-components, provides, among other features, various systems, servers, devices, methods, media, programs, and platforms for implementing a natural language order till module configured with a free-form text box to receive user input data related to trade details with no restrictions or limitations, but the disclosure is not limited thereto. For example, the present disclosure, through one or more of its various aspects, embodiments, and/or specific features or sub-components, also provides, among other features, various systems, servers, devices, methods, media, programs, and platforms for implementing a natural language order fill module configured with a free-form text box that allows users to enter trade details just as they would typically speak or type including abbreviations, varying sentence syntax, special characters, and details that may not follow the ticket entry field order, but the disclosure is not limited thereto.

In addition, the present disclosure, through one or more of its various aspects, embodiments, and/or specific features or sub-components, also provides, among other features, various systems, servers, devices, methods, media, programs, and platforms for implementing a natural language order fill module configured with a free-form text box that can accept copied and pasted trade details from previous text box entries and/or email messages, and interpreting and extracting trade details using neural networks to automatically fill in the corresponding trading ticket fields, in real-time, but the disclosure is not limited thereto.

According to an aspect of the present disclosure, a method for implementing a natural language order fill module by utilizing one or more processors and one or more memories is disclosed. The method may include: configuring a free-form text box to receive user input data corresponding to trade details of a particular trade; implementing neural networks algorithm to interpret and extract key trade details data from the receive user input data corresponding to the trade details of the particular trade regardless of text structure of the input data; and automatically filling in corresponding trading ticket fields in real-time based on the extracted key trade details data.

According to another aspect of the present disclosure, wherein the user input data may include one or more of the following data associated with the particular trade that do not follow a ticket entry field order: abbreviations data, varying sentence syntax data, special characters data and details data, but the disclosure is not limited thereto.

According to yet another aspect of the present disclosure, the method may further include: configuring the free-form text box to receive copied and pasted trade details data from previous text box entries and/or electronic messages.

According to a further aspect of the present disclosure, the method may further include: implementing a bi-directional long short term memory (LSTM) model for automatically filling in the corresponding trading ticket fields, but the disclosure is not limited thereto.

According to an additional aspect of the present disclosure, the method may further include: building a machine learning model configured to learn different trading ticket fields per product and asset class, business terms, and nomenclature.

According to yet another aspect of the present disclosure, the method may further include: training the machine: learning model with additional data for relatively easier scalability.

According to a further aspect of the present disclosure, the method may further include: training the machine learning model to auto-fill, in real-time, ticket order entry details data as the user types into the free-form text box.

According to yet another aspect of the present disclosure, a system for implementing a natural language order till module is disclosed. The system may include a database that stores data corresponding to trade details of a particular trade; and a processor operatively coupled to the database via a communication network. The processor may be configured to execute the following: configuring a free-form text box to receive user input data corresponding to the trade details of the particular trade, wherein the user input data may include one or more of the following data associated with the particular trade that do not follow a ticket entry field order: abbreviations data, varying sentence syntax data, special characters data and details data, but the disclosure is not limited thereto; implementing neural networks algorithm to interpret and extract key trade details data from the receive user input data corresponding to the trade details of the particular trade regardless of text structure of the input data; and automatically filling in corresponding trading ticket fields in real-time based on the extracted key trade details data.

According to an additional aspect of the present disclosure, the processor may further configure the free-form text box to receive user input of copied and pasted trade details data from previous text box entries and/or electronic messages.

According to a further aspect of the present disclosure, the processor may be further configured to: implement a bi-directional long short term memory (LSTM) model for automatically filling in the corresponding trading ticket fields.

According to yet another aspect of the present disclosure, the processor may be further configured to: build a machine learning model configured to learn different trading ticket fields per product and asset class, business terms, and nomenclature.

According to an aspect of the present disclosure, the processor may be further configured to: train the machine learning model with additional data for relatively easier scalability.

According to another aspect of the present disclosure, the processor may be further configured to train the machine learning model to auto-fill, in real-time, ticket order entry details data as the user types into the free-form text box.

According to yet another aspect of the present disclosure, a non-transitory computer readable medium configured to store instructions for implementing a natural language order fill module is disclosed. The instructions, when executed, may cause a processor to perform the following: configuring a free-form text box to receive user input data corresponding to trade details of a particular trade, wherein the user input data may include one or more of the following data associated with the particular trade that do not follow a ticket entry field order: abbreviations data, varying sentence syntax data, special characters data and details data, but the disclosure is not limited thereto; implementing neural networks algorithm to interpret and extract key trade details data from the receive user input data corresponding to the trade details of the particular trade regardless of text structure of the input data; and automatically filling in corresponding trading ticket fields in real-time based on the extracted key trade details data.

According to a further aspect of the present disclosure, the instructions, when executed, may further cause the processor to perform the following: configuring the free-form text box to receive user input of copied and pasted trade details data from previous text box entries and/or electronic messages.

According to an additional aspect of the present disclosure, the instructions, when executed, may further cause the processor to perform the following: implementing a bi-directional long short term memory (LSTM) model for automatically filling in the corresponding trading ticket fields.

According to yet another aspect of the present disclosure, the instructions, when executed, may further cause the processor to perform the following: building a machine learning model configured to learn different trading ticket fields per product and asset class, business terms, and nomenclature.

According to a further aspect of the present disclosure, the instructions, when executed, may further cause the processor to perform the following: training the machine learning model with additional data for relatively easier scalability.

According to yet another aspect of the present disclosure, the instructions, when executed, may further cause the processor to perform the following: training the machine learning model to auto-fill, in real-time, ticket order entry details data as the user types into the free-form text box.

BRIEF DESCRIPTION OF THE DRAWINGS

The present disclosure is further described in the detailed description which follows, in reference to the noted plurality of drawings, by way of no limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alter each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
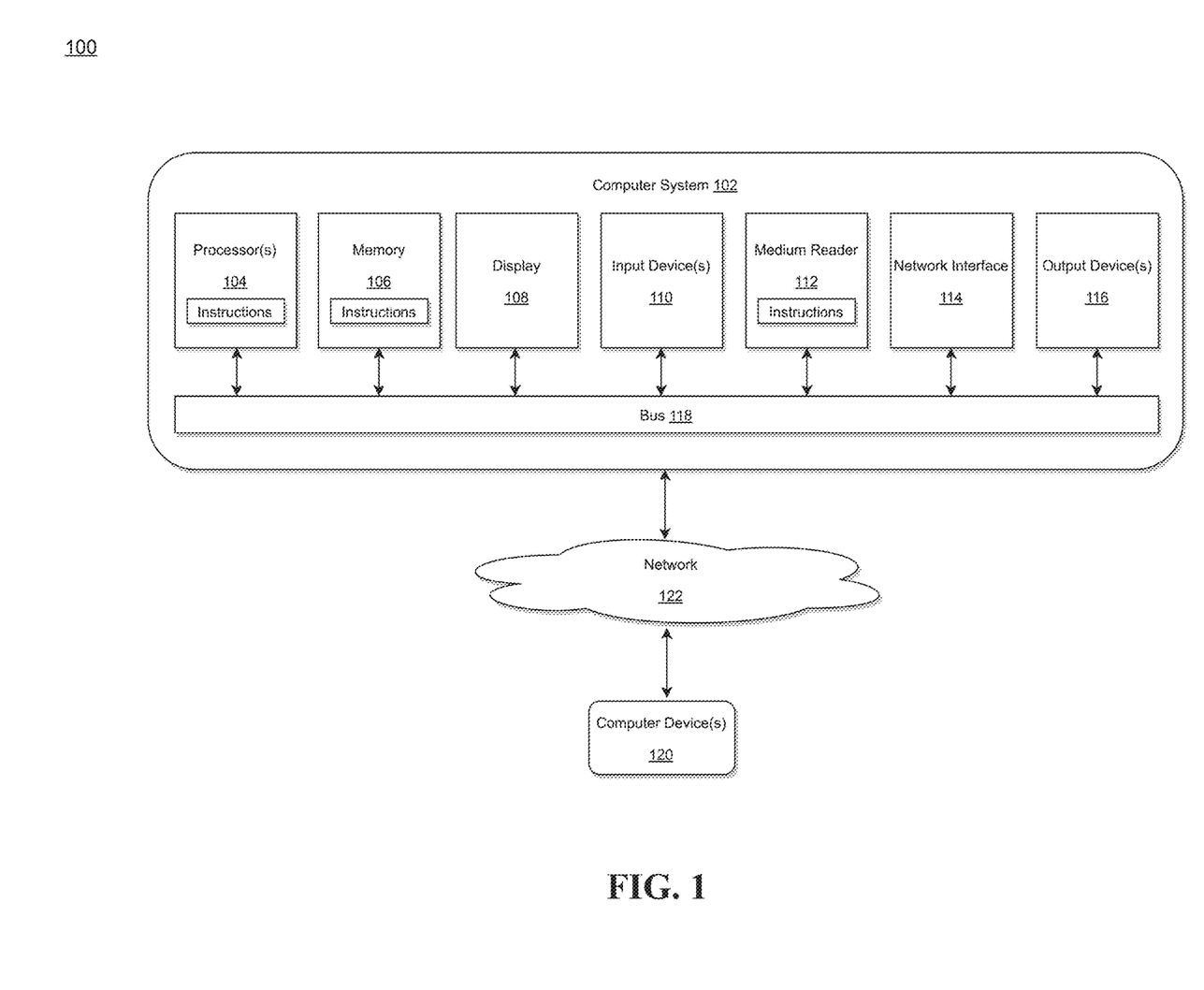
FIG. 1 illustrates a computer system for implementing a natural language order fill module configured with a free-form text box to receive user input data related to trade details with no restrictions or limitations in accordance with an exemplary embodiment.

FIG. 1 is an exemplary system for use in implementing a natural language order fill module configured with a free-form text box to receive user input data related to trade details with no restrictions or limitations in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a natural language order fill module configured with a free-form text box to receive user input data related to trade details with no restrictions or limitations, but the disclosure is not limited thereto. For example, various embodiments described herein may also provide optimized processes of implementing a natural language order fill module configured with a free-form text box that allows users to enter trade details just as they would typically speak or type including abbreviations, varying sentence syntax, special characters, and details that may not follow the ticket entry field order, but the disclosure is not limited thereto.

Figure 2:
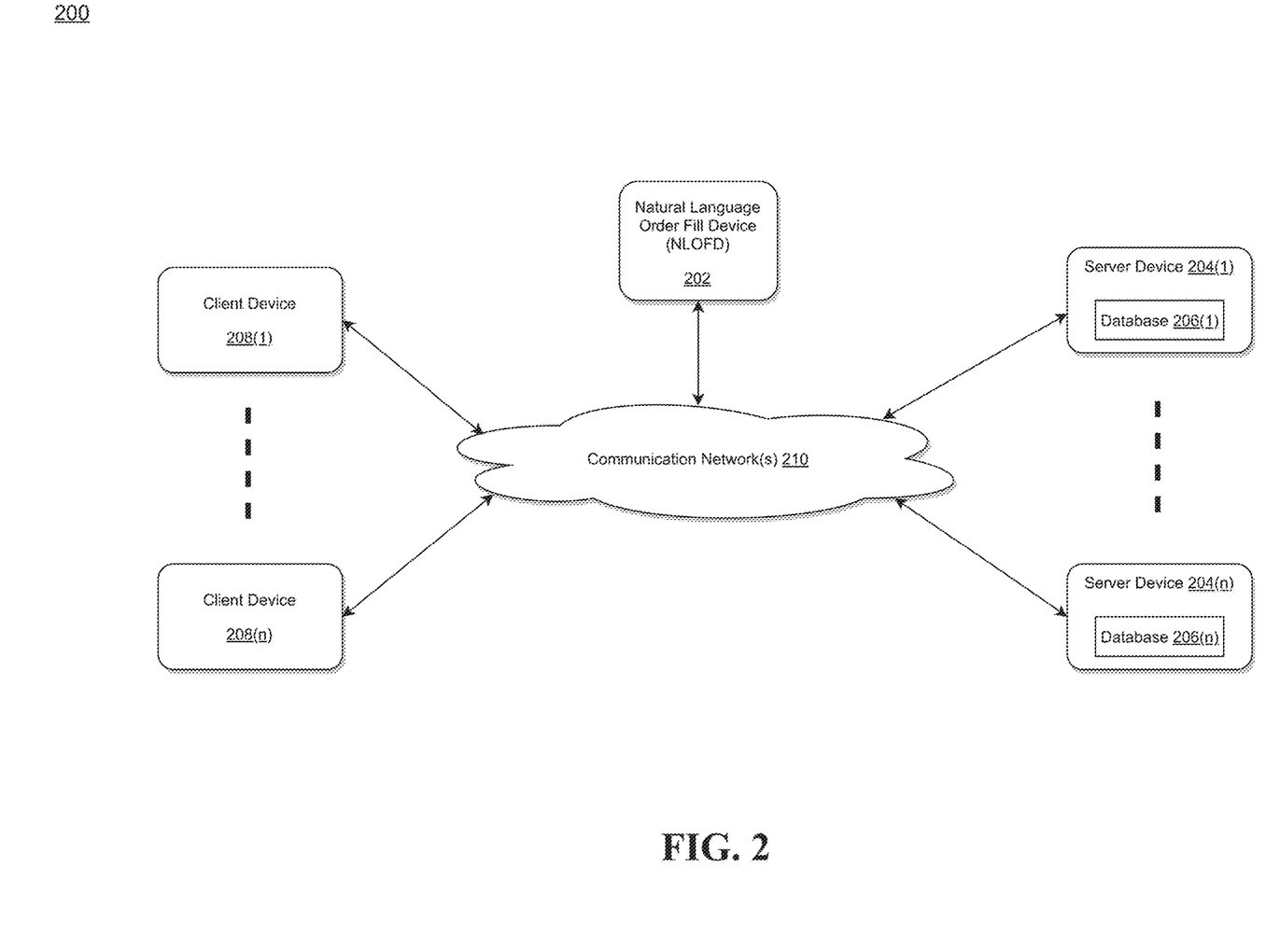
FIG. 2 illustrates an exemplary diagram of a network environment with natural language order fill device in accordance with an exemplary embodiment.

Referring to FIG. 2, a schematic of an exemplary network environment 200 for implementing a natural language order fill device (NLOFD) of the instant disclosure is illustrated.

According to exemplary embodiments, the above-described problems associated with conventional methods and systems may be overcome by implementing an NLOFD 202 as illustrated in FIG. 2 by implementing a natural language order fill module configured with a free-form text box to receive user input data related to trade details with no restrictions or limitations, but the disclosure is not limited thereto. For example, according to exemplary embodiments, the above-described problems associated with conventional methods and systems may be overcome by implementing an NLOFD 202 as illustrated in FIG. 2 by implementing a natural language order fill module configured with a free-form text box that allows users to enter trade details just as they would typically speak or type including abbreviations, varying sentence syntax, special characters, and details that may not follow the ticket entry field order, but the disclosure is not limited thereto.

The NLOFD 202 may be the same or similar to the computer system 102 as described with respect FIG. 1.

The NLOFD 202 may store one or more applications that can include executable instructions that, when executed by the NLOFD 202, cause the NLOFD 202 to perform actions, such as to transmit, receive, or otherwise process network messages, for example, and to perform other actions described and illustrated below with reference to the figures. The application(s) may be implemented as modules or component; of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the NLOFD 202 itself, may be located in virtual server(s) running in a cloud-based computing environment rather than being tied to one or more specific physical network computing devices. Also, the application(s) may be running in one or more virtual machines (VMs) executing on the NLOFD 202. Additionally, in one or more embodiments of this technology, virtual machine(s) running on the NLOFD 202 may be managed or supervised by a hypervisor.

In the network environment 200 of FIG. 2, the NLOFD 202 is coupled to a plurality of server devices 204(1)-204(n) that hosts a plurality of databases 206(1)-206(n), and also to a plurality of client devices 208(1)-208(n) via communication network(s) 210. A communication interface of the NLOFD 202, such as the network interface 114 of the computer system 102 of FIG. 1, operatively couples and communicates between the NLOFD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the NLOFD 202, the server devices 204(1)-204(n), and/or the client devices 208(1)-208(n) pray be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The NLOFD 202 may be a standalone device or integrated with one or other devices or apparatuses, such as one or more of the server devices 204(1)-204(n), for example. In one particular example, the NLOFD 202 may be hosted by one of the server devices 204(1)-204(n), and other arrangements are also possible. Moreover, one or more of the devices of the NLOFD 202 may be in a same or a different communication network including one or ore public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the NLOFD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network competing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the NLOFD 202 that may be configured for implementing a natural language order fill module configured with a free-form text box to receive user input data related to trade details with no restrictions or limitations, but the disclosure is not limited thereto. For example, according to exemplary embodiments, the client devices 208(1)-208(n) in this example may include any type of computing device that can facilitate the implementation of the NLOFD 202 that may be configured for implementing a natural language order fill module configured with a free-form text box that allows users to enter trade details just as they would typically speak or type including abbreviations, varying sentence syntax, special characters, and details that may not follow the ticket entry field order, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the NLOFD 202 via the communication network(s) 210 in order to communicate user requests. The client devices 208(1)-208(n) may further include, among other features, a display device, such as a display screen or touchscreen, and/or an Input device, such as a keyboard, for example.

Although the exemplary network environment 200 with the NLOFD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the NLOFD 202, the server devices 204(1)-204(n), or the client devices 208(1)-208(n), for example, may be configured to operate as virtual instances on the same physical machine. For example, one or more of the NLOFD 202, the server devices 204(1)-204(n), or the client devices 208(1)-208(n) may operate on the same physical device rather than as separate devices communicating through communication network(s) 210. Additionally, there may be more or fewer NLOFDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
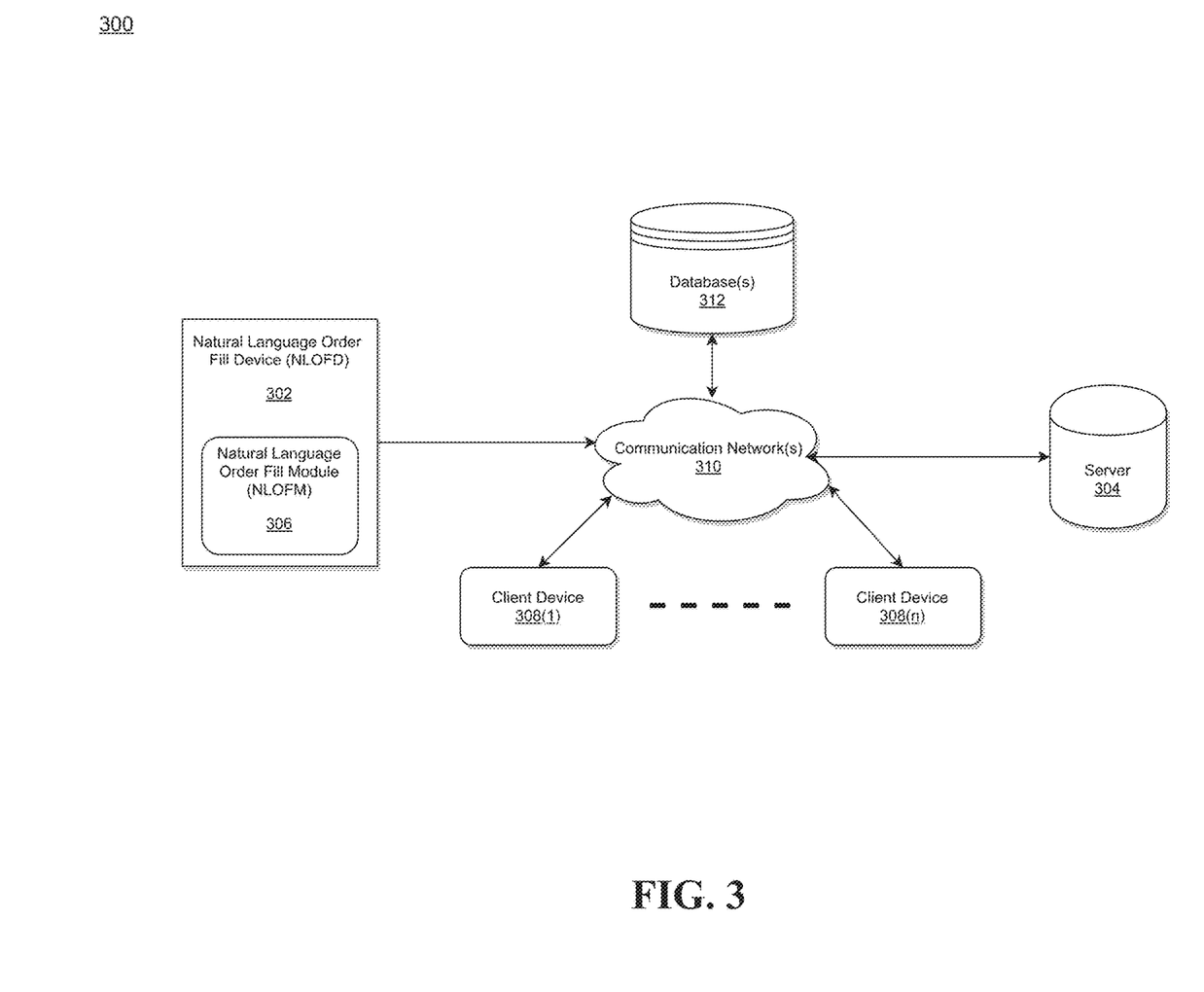
FIG. 3 illustrates a system diagram for implementing a natural language order fill device with a natural language order fill module in accordance with an exemplary embodiment.

FIG. 3 illustrates a system diagram 300 for implementing an NLOFD with a natural language order fill module (NLOFM) in accordance with an exemplary embodiment.

As illustrated in FIG. 3, the NLOFD 302 including the NLOFM 306 may be connected to a server 304, and a database 312 via a communication network 310. The NLOFD 302 may also be connected to a plurality of client devices 308(1)-308(n) via the communication network 310, but the disclosure is not limited thereto. According to exemplary embodiments, the NLOFM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the NLOFD 302 is described and shown in FIG. 3 as including the NLOFM 306, although it may include other rules, policies, modules, databases, or applications, for example. According to exemplary embodiments, the database 312 may be embedded within the NLOFD 302. Although only one database 312 is illustrated in FIG. 3, according to exemplary embodiments, a plurality of databases 312 may be provided. The database 312 may include one or more memories configured to store login information, data files, data content, API specification definition file (e.g., in JSON format), user profile data, data corresponding to trade details of a particular trade, etc., but the disclosure is not limited thereto. For example, the database 312 may include one or more memories configured to store information including: rules, programs, trade requirements, machine learning models, log data, hash values, etc., but the disclosure is not limited thereto. According to exemplary embodiments, the NLOFM 306 may be configured to be storage platform agnostic—configured to be deployed across multiple storage layers.

According to exemplary embodiments, the NLOFM 306 may be configured to receive continuous feed of data from the database 312 and the server 304 via the communication network 310. According to exemplary embodiments, the database 312 may also be a private cloud-based database that supports user authentication, database security, and integration with existing databases and developments as well as stores open API specification definition file (i.e., in JSON format) corresponding to an application, but the disclosure, is not limited thereto.

As will be described below, the NLOFM 306 may configure a free-form text box to receive user input data corresponding to trade details of a particular trade, wherein the user input data may include one or more of the following data associated with the particular trade that do not follow a ticket entry field order: abbreviations data, varying sentence syntax data, special characters data and details data, but the disclosure is not limited thereto; implement neural networks algorithm to interpret and extract key trade details data from the receive user input data corresponding to the trade details of the particular trade regardless of text structure of the input data; and automatically fill in corresponding trading ticket fields in real-time based on the extracted key trade details data, but the disclosure is not limited thereto.

The plurality of client devices 308(1)-308(n) are illustrated as being in communication with the NLOFD 302. In this regard, the plurality of client devices 308(1)-308(n) may be "clients" of the NLOFD 302 and are described herein as such. Nevertheless, it is to be known and understood that the plurality of client devices 308(1)-308(n) need not necessarily be "clients" of the NLOFD 302, or any entity described in association therewith herein. Any additional or alternative relationship may exist between either or more of the plurality of client devices 308(1)-308(n) and the NLOFD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the NLOFD 302 via broadband or cellular communication. Of course, these embodiments are merely exemplary and are not limiting or exhaustive.

Figure 4:
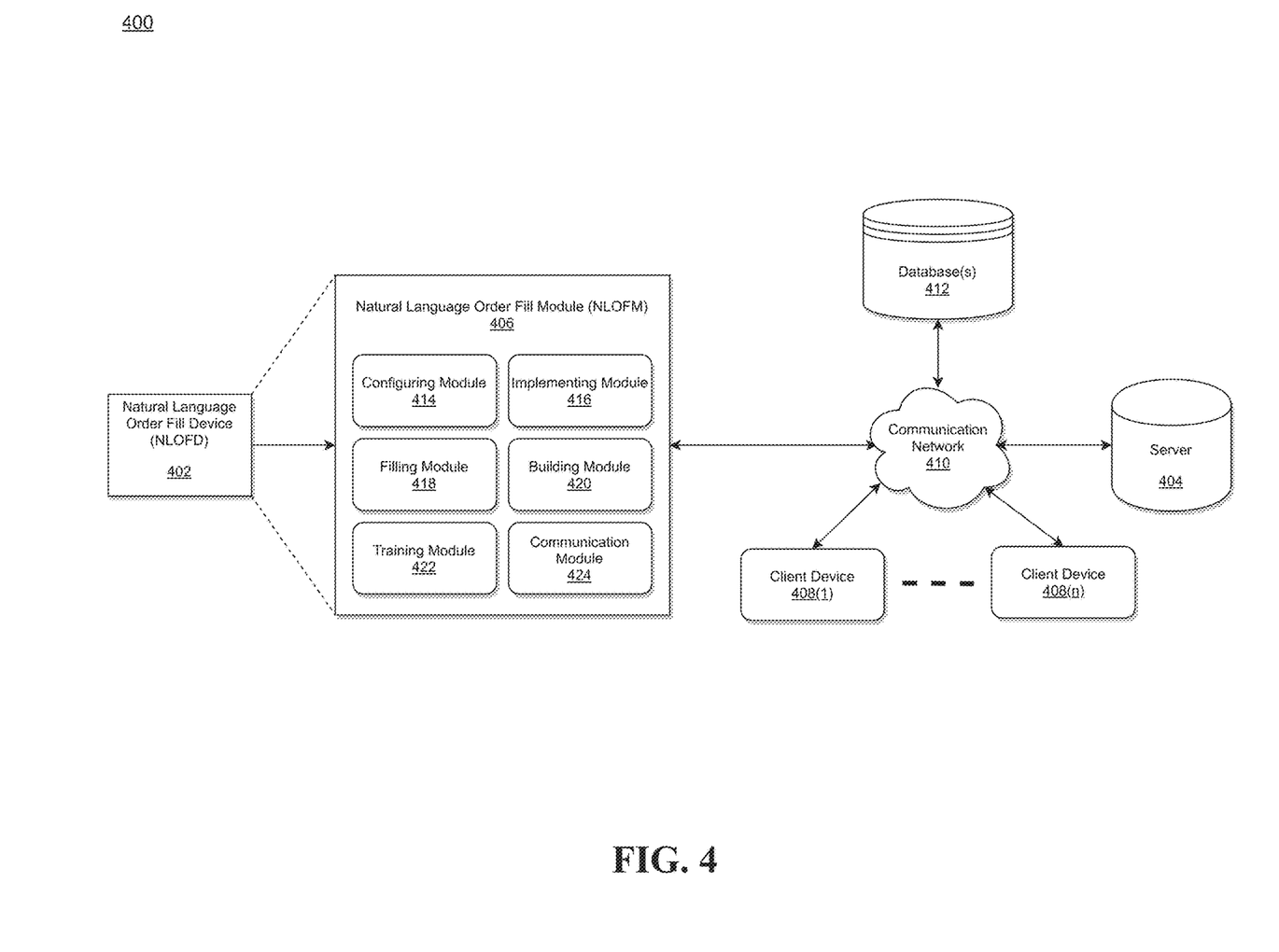
FIG. 4 illustrates a system diagram for implementing a natural language order fill module of FIG. 3 in accordance with an exemplary embodiment.

FIG. 4 illustrates a system diagram for implementing a natural language order fill module (NLOFM) of FIG. 3 in accordance with an exemplary embodiment.

As illustrated in FIG. 4, the system 400 may include a natural language order fill device (NLOFD) 402 within which an NLOFM 406 may be embedded, a database 412, a server 404, client devices 408(1)-408(n), and a communication network 410. According to exemplary embodiments, the NLOFD 402, NLOFM 406, database 412, the server 404, the client devices 408(1)-408(n), and the communication network 410 as illustrated in FIG. 4 may be the same or similar to the NLOFD 302, the NLOFM 306, the database 312, the server 304, the client devices 308(1)-308(n), and the communication network 310, respectively, as illustrated in FIG. 3.

As illustrated in FIG. 4, the NLOFM 406 may include a configuring module 414, a implementing module 416, a filling module 418, a building module 420, a training module 422, and a communication module 424. According to exemplary embodiments, the database 412 may be external to the NLOFD 402 may include various systems that are managed and operated by an organization. Alternatively, according to exemplary embodiments, the database 412 may be embedded within the NLOFD 402 and/or within the NLOFM 406.

According to exemplary embodiments, the NLOFM 406 may be implemented via user interfaces, e.g., web user interface, but the disclosure is not limited thereto, and may be integrated with a private cloud platform and a distributed file system platform via the NLOFM 406 and an authentication service, but the disclosure is not limited thereto.

The process may be executed via the communication module 424 and the communication network 410, which may comprise plural networks as described above. For example, in an exemplary embodiment, the various components of the NLOFM 406 may communicate with the server 404, and the database 412 via the communication module 424 and the communication network 410. Of course, these embodiments are merely exemplary and are not limiting exhaustive.

According to exemplary embodiments, the communication network 410 and the communication module 424 may be configured to establish a link between the database 412, the client devices 408(1)-408(n) and the NLOFM 406.

According to exemplary embodiments, each of the configuring module 414, implementing module 416, filling module 418, building module 420, training module 422, and the communication module 424 may be implemented by microprocessors or similar, they may be programmed using software (e.g., microcode) to perform various functions discussed herein and may optionally be driven by firmware and/or software. Alternatively, each of the configuring module 414, implementing module 416, filling module 418, building module 420, training module 422, and the communication module 424 may be implemented by dedicated hardware, or as a combination of dedicated hardware to perform some functions and a processor (e.g., one or more programmed microprocessors and associated circuitry) to perform other functions. Also, according to exemplary embodiments, each of the configuring module 414, implementing module 416, filling module 418, building module 420, training module 422, and the communication module 424 may be physically separated into two or more interacting and discrete blocks, units, devices, and/or modules without departing from the scope of the inventive concepts.

According to exemplary embodiments, each of the configuring module 414, implementing module 416, filling module 418, building module 420, training module 422, and the communication module 424 of the NLOFM 406 may be called by corresponding API, but the disclosure is not limited thereto.

According to exemplary embodiments, the configuring module 414 may configure a free-form text box within the platform of the NLOFM 406 to receive user input data corresponding to the trade details of the particular trade. The user input data may include one or more of the following data associated with the particular trade that do not follow a ticket entry field order: abbreviations data, varying sentence syntax data, special characters data and details data, but the disclosure is not limited thereto.

Conventional trade order process may be very structured and may offer no flexibility; may not support copy-paste option; and may understand input only in a certain order which also varies with the product implementation.

However, according to exemplary embodiments, the NLOFM 406 is configured with a free-form text box to receive user input data related to trade details with no restrictions or limitations, but the disclosure is not limited thereto. For example, the NLOFM 406 is configured in a manner such that it allows users to enter trade details just as they would typically speak or type including abbreviations, varying sentence syntax, special characters, and details that may not follow the ticket entry field order, but the disclosure is not limited thereto.

For example, according to exemplary embodiments, the received input data may include, but not limited thereto, the following samples: b c 1mio aapl.o at 23.112 4m; client longs 41000 put of tsla.o of 5y at 12.2; buy call option 5000 tsla.o at 322 of 10m expiry; long 10000 options of aapl.o put at 21.33; Client shorts .spx put 2.5mio at 112.45 expiring Dec. 11, 2025, etc. The implementing module 416 of the NLOFM 406 may be configured to implement neural networks algorithm to interpret and extract key trade details data from the received user input data corresponding to the trade details of the particular trade regardless of text structure of the input data. The filling module 418 of the NLOFM 406 may be configured to automatically fill in corresponding trading ticket fields in real-time based on the extracted key trade details data.

According to exemplary embodiments, NLOFM 406 may further configure the free-form text box to receive user input of copied and pasted trade details data from previous text box entries and/or electronic messages.

According to exemplary embodiments, the implementing module 416 of the NLOFM 406 may be configured to implement a bi-directional long short term memory (LSTM) model for automatically filling in the corresponding trading ticket fields.

According to exemplary embodiments, the building module 420 of the NLOFM 406 may be configured to build a machine learning model configured to learn different trading ticket fields per product and asset class, business terms, and nomenclature.

According to exemplary embodiments, the training module 422 of the NLOFM 406 may be configured to train the machine learning model with additional data for relatively easier scalability.

According to exemplary embodiments, the training module 422 of the NLOFM 406 may be further configured to train the machine learning model to auto-fill, in real-time, ticket order entry details data as the user types into the free-form text box.

According to exemplary embodiments, the building module 420 of the NLOFM 406 builds the machine learning model in a manner such that the model is intelligent enough to extract out the key trade details from any given text structure and maps to the appropriate order entry form fields. The training module 422 of the NLOFM 406 may train the data generation by extracting useful columns (e.g., quantity, security, option type, expiry, etc., but the disclosure is not limited thereto) and data from the production trade database to ensure the model generated data is similar to actual use cases and can handle a large number of training scenarios/sentences.

According to exemplary embodiments, the NLOFM 406 may utilize a Chatito file with a basic template of grammar definitions and all the keywords a user might use to generate all the possible permutations with placeholders, which are then substituted with the corresponding (actual) values from production trade data.

Over time, the model generated by the building module 420 learns the different trading ticket fields per product and asset class, business terms, and nomenclature. The NLOFM 406, according to exemplary embodiments, utilizes the bi-directional LSTM model for ensuring better accuracy in understanding what the user entered in the text box and better prediction for the order entry form auto-fill. In this exemplary embodiment, bi-directional LSTM model is used because the data is sequential and uses all the previously entered text before predicting the trade details.

According to exemplary embodiments, the NLOFM 406 may be further configured for integrating into any brokerage trading ticket and voice to text/memo capabilities platforms.

Figure 5:
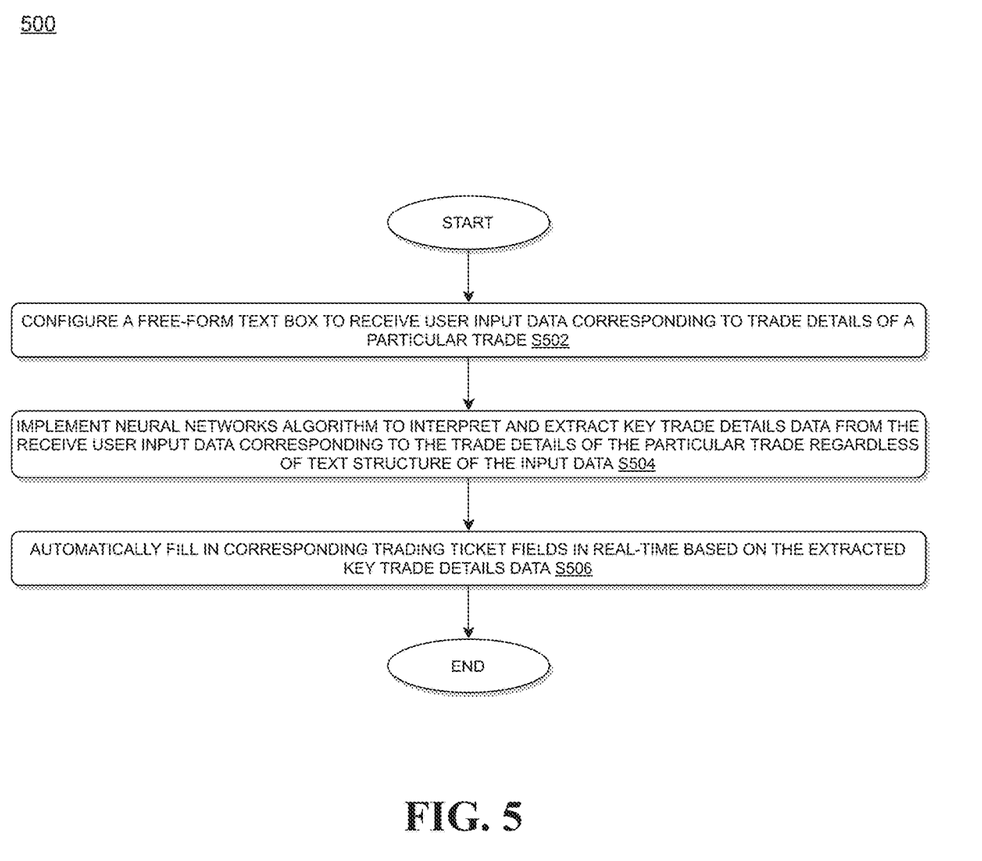
FIG. 5 illustrates a flow diagram for implementing a natural language order fill module in accordance with an exemplary embodiment.

FIG. 5 illustrates a flow diagram for implementing a natural language order fill module in accordance with an exemplary embodiment.

In the process 500 of FIG. 5, at step S502, a free-form text box may be configured to receive user input data corresponding to the trade details of the particular trade, wherein the user input data may include one or more of the following data associated with the particular trade that do not follow a ticket entry field order: abbreviations data, varying sentence syntax data, special characters data and details data, but the disclosure is not limited thereto.

At step S504, the process 500 may implement neural networks algorithm to interpret and extract key trade details data from the receive user input data corresponding to the trade details of the particular trade regardless of text structure of the input data At step S506, the process 500 may automatically fill in corresponding trading ticket fields in real-time based on the extracted key trade details data.

According to exemplary embodiments, the process 500 may further include: configuring the free-form text box to receive copied and pasted trade details data from previous text box entries and/or electronic messages.

According to exemplary embodiments, the process 500 may further include: implementing a bi-directional LSTM model for automatically filling in the corresponding trading ticket fields, but the disclosure is not limited thereto.

According to exemplary embodiments, the process 500 may further include: building a machine learning model configured to learn different trading ticket fields per product and asset class, business terms, and nomenclature, but the disclosure is not limited thereto.

According to exemplary embodiments, the process 500 may further include: building a biller search scoring model based on existing biller directory data and the customer profile service area popularity model in response to the search query data.

According to exemplary embodiments, the process 500 may further include: training the machine learning model with additional data for relatively easier scalability.

According to exemplary embodiments, the process 500 may further include: training the machine learning model to auto-fill, in real-time, ticket order entry details data as the user types into the free-form text box.

According to exemplary embodiments, the NLOFD 402 may include a memory (e.g., a memory 106 as illustrated in FIG. 1) which may be a non-transitory computer readable medium that may be configured to store instructions for implementing the NLOFM 406 for automatically filling in corresponding trading ticket fields in real-time based on extracted key trade details data as disclosed herein. The NLOFD 402 may also include a medium reader (e.g., a medium reader 112 as illustrated in FIG. 1) which may be configured to read any one or more sets of instructions, e.g., software, from any of the memories described herein. The instructions, when executed by a processor embedded within the NLOFM 406 or within the NLOFD 402, may be used to perform one or more of the methods and processes as described herein. In a particular embodiment, the instructions may reside completely, or at least partially, within the memory 106, the medium reader 112, and/or the processor 104 (see FIG. 1) during execution by the NLOFD 402.

For example, the instructions, when executed, may cause the processor 104 to perform the following: configuring a free-form text box to receive user input data corresponding to trade details of a particular trade, wherein the user input data may include one or more of the following data associated with the particular trade that do not follow a ticket entry field order: abbreviations data, varying sentence syntax data, special characters data and details data, but the disclosure is not limited thereto; implementing neural networks algorithm to interpret and extract key trade details data from the receive user input data corresponding to the trade details of the particular trade regardless of text structure of the input data; and automatically filling in corresponding trading ticket fields in real-time based on the extracted key trade details data, but the disclosure is not limited thereto.

According to exemplary embodiments, the instructions, when executed, may further cause the processor 104 to perform the following: configuring the free-form text box to receive user input of copied and pasted trade details data from previous text box entries and/or electronic messages.

According to exemplary embodiments, the instructions, when executed, may further cause the processor 104 to perform the following: implementing a bi-directional LSTM model for automatically filling in the corresponding trading ticket fields.

According to exemplary embodiments, the instructions, when executed, may further cause the processor 104 to perform the following: building a machine learning model configured to learn different trading ticket fields per product and asset class, business terms, and nomenclature.

According to exemplary embodiments, the instructions, when executed, may further cause the processor 104 to perform the following: training the machine learning model with additional data for relatively easier scalability.

According to exemplary embodiments, the instructions, when executed, may further cause the processor 104 to perform the following: training the machine learning model to auto-fill, in real-time, ticket order entry details data as the user types into the free-form text box.

According to exemplary embodiments as disclosed above in FIGS. 1-5, technical improvements effected by the instant disclosure may include platforms for implementing a natural language order fill module configured with a free-form text box to receive user input data related to trade details with no restrictions or limitations, but the disclosure is not limited thereto. For example, according to exemplary embodiments as disclosed above in FIGS. 1-5, technical improvements effected by the instant disclosure may also include platforms for implementing a natural language order till module configured with a free-form text box that allows users to enter trade details just as they would typically speak or type including abbreviations, varying sentence syntax, special characters, and details that may not follow the ticket entry field order, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a natural language order fill module by utilizing one or more processors and one or more memories, the method comprising:

building a machine learning model configured to learn different trading ticket fields per product and asset class, business terms, and nomenclature;

training, by a processor of the one or more processors, the machine learning model to auto-fill, in real-time, ticket order entry details data as a user types, via an input device, into the free-form text box;

configuring, by the processor, a free-form text box to receive, from the input device, user input data corresponding to trade details of a particular trade;

implementing neural networks algorithm to interpret and extract key trade details data from the user input data corresponding to the trade details of the particular trade regardless of text structure of the user input data; and implementing, by the processor, a bi-directional long short term memory (LSTM) model that utilizes all previously entered text to predict and automatically fill in corresponding trading ticket fields in real-time, as the user inputs, via the input device, the user input data into the free-form text box, based on the key trade details data.

2. The method according to claim 1, wherein the user input data includes one or more of the following data associated with the particular trade that do not follow a ticket entry field order: abbreviations data, varying sentence syntax data, special characters data and details data.

3. The method according to claim 1, further comprising:
configuring the free-form text box to receive user input of copied and pasted trade details data from previous text box entries and/or electronic messages.

4. The method according to claim 1, further comprising: training the machine learning model with additional data for relatively easier scalability.

5. The method according to claim 1, wherein the training the machine learning model comprises:
extracting columns and data from a database that stores the data corresponding to the trade details of the particular trade.

6. The method according to claim 5, further comprising:
generating, by utilizing a file with a basic template of grammar definitions and keywords that the user may use, all possible permutations of the keywords with placeholders; and
substituting the placeholders with actual data from the database.

7. A system for implementing a natural language order fill module, the system comprising:
a database that stores data corresponding to trade details of a particular trade; and
a processor operatively coupled to the database via a communication network, wherein the processor is configured to execute the following:
building a machine learning model configured to learn different trading ticket fields per product and asset class, business terms, and nomenclature;
training, by the processor, the machine learning model to auto-fill, in real-time, ticket order entry details data as a user types, via an input device, into the free-form text box;
configuring, by the processor, a free-form text box to receive, from the input device, user input data corresponding to the trade details of the particular trade;
implementing neural networks algorithm to interpret and extract key trade details data from the user input data corresponding to the trade details of the particular trade regardless of text structure of the input data; and
implementing, by the processor, a bi-directional long short term memory (LSTM) model that utilizes all previously entered text to predict and automatically fill in corresponding trading ticket fields in real-time, as the user inputs, via the input device, the user input data into the free-form text box, based on the key trade details data.

8. The system according to claim 7, wherein the user input data includes one or more of the following data associated with the particular trade that do not follow a ticket entry field order: abbreviations data, varying sentence syntax data, special characters data and details data.

9. The system according to claim 7, wherein the processor further configures the free-form text box to receive user input of copied and pasted trade details data from previous text box entries and/or electronic messages.

10. The system according to claim 7, wherein the processor is further configured to:
train the machine learning model with additional data for relatively easier scalability.

11. The system according to claim 7, wherein the training the machine learning model comprises:
extracting columns and data from the database.

12. The system according to claim 11, wherein the processor is further configured to execute the following:
generating, by utilizing a file with a basic template of grammar definitions and keywords that the user may use, all possible permutations of the keywords with placeholders; and
substituting the placeholders with actual data from the database.

13. A non-transitory computer readable medium configured to store instructions for implementing a natural language order fill module, wherein, when executed, the instructions cause a processor to perform the following:
building a machine learning model configured to learn different trading ticket fields per product and asset class, business terms, and nomenclature;
training, by the processor, the machine learning model to auto-fill, in real-time, ticket order entry details data as a user types, via an input device, into the free-form text box;
configuring, by the processor, a free-form text box to receive, from the input device, user input data corresponding to trade details of a particular trade;
implementing neural networks algorithm to interpret and extract key trade details data from the user input data corresponding to the trade details of the particular trade regardless of text structure of the input data; and
implementing, by the processor, a bi-directional long short term memory (LSTM) model that utilizes all previously entered text to predict and automatically fill in corresponding trading ticket fields in real-time, as the user inputs, via the input device, the user input data into the free-form text box, based on the key trade details data.

14. The non-transitory computer readable medium according to claim 13, wherein the user input data includes one or more of the following data associated with the particular trade that do not follow a ticket entry field order: abbreviations data, varying sentence syntax data, special characters data and details data.

15. The non-transitory computer readable medium according to claim 13, wherein, when executed, the instructions further cause the processor to perform the following:
configuring the free-form text box to receive user input of copied and pasted trade details data from previous text box entries and/or electronic messages.

16. The non-transitory computer readable medium according to claim 13, wherein the training the machine learning model comprises:
extracting columns and data from a database that stores the data corresponding to the trade details of the particular trade.

17. The non-transitory computer readable medium according to claim 16, wherein, when executed, the instructions further cause the processor to perform the following:
generating, by utilizing a file with a basic template of grammar definitions and keywords that the user may use, all possible permutations of the keywords with placeholders; and
substituting the placeholders with actual data from the database.

* * * * *